United States Patent
Abe

(10) Patent No.: US 8,542,885 B2
(45) Date of Patent: Sep. 24, 2013

(54) IMAGING DEVICE, IMAGING METHOD AND COMPUTER PROGRAM

(75) Inventor: Hiroshi Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1377 days.

(21) Appl. No.: 12/126,401

(22) Filed: May 23, 2008

(65) Prior Publication Data

US 2008/0317285 A1 Dec. 25, 2008

(30) Foreign Application Priority Data

Jun. 13, 2007 (JP) ................................. 2007-156066

(51) Int. Cl.
*G06K 9/00* (2006.01)

(52) U.S. Cl.
USPC ........... 382/118; 382/100; 382/115; 382/181; 382/190; 382/209

(58) Field of Classification Search
USPC .................. 382/100, 115, 118, 181, 190, 209
See application file for complete search history.

(56) References Cited

U.S. PATENT DOCUMENTS

| | | | | |
|---|---|---|---|---|
| 7,376,347 | B2 * | 5/2008 | Sugimoto | 396/60 |
| 8,013,929 | B2 * | 9/2011 | Sudo et al. | 348/346 |
| 8,130,243 | B2 * | 3/2012 | Sudo et al. | 345/632 |
| 2003/0108241 | A1 * | 6/2003 | Colmenarez et al. | 382/181 |
| 2004/0218916 | A1 | 11/2004 | Yamaguchi et al. | |
| 2007/0195174 | A1 * | 8/2007 | Oren | 348/222.1 |
| 2008/0037841 | A1 * | 2/2008 | Ogawa | 382/118 |
| 2008/0117310 | A1 * | 5/2008 | Kaneda et al. | 348/231.2 |
| 2008/0292299 | A1 * | 11/2008 | Kretz et al. | 396/263 |
| 2009/0190803 | A1 * | 7/2009 | Neghina et al. | 382/118 |

FOREIGN PATENT DOCUMENTS

| | | |
|---|---|---|
| JP | 9-171560 | 6/1997 |
| JP | 2000-347278 | 12/2000 |
| JP | 2003-271933 | 9/2003 |
| JP | 2004-294498 | 10/2004 |
| JP | 2005-318515 | 11/2005 |
| JP | 2006-33437 | 2/2006 |
| JP | 2006-94030 | 4/2006 |
| JP | 2006-145629 | 6/2006 |
| JP | 2006-201531 | 8/2006 |
| JP | 2006-237803 | 9/2006 |
| JP | 2006-253805 | 9/2006 |
| JP | 2008-201531 | 9/2008 |
| WO | WO 2007/060980 A1 | 5/2007 |

OTHER PUBLICATIONS

U.S. Appl. No. 12/100,516, filed Apr. 10, 2008, Abe.

(Continued)

*Primary Examiner* — Wesley Tucker
(74) *Attorney, Agent, or Firm* — Oblon, Spivak, McClelland, Maier & Neustadt, L.L.P.

(57) ABSTRACT

With a digital still camera, a user freely detects a smiling face on a touchpanel displaying a through image and selects a subject having that smiling face. The digital still camera displays the smiling face as a smiling face detection target and a non-target detected face on the through image in a distinctly different manner to discriminate the smiling face detection target from the non-target detected face. For example, when persons in an event such as a party are photographed in a relatively large viewing angle, an auto photographing operation may be performed in response to smiling face detections on condition that at least two members in the party are smiling.

15 Claims, 15 Drawing Sheets

(56) References Cited

OTHER PUBLICATIONS

U.S. Appl. No. 12/107,314, filed Apr. 22, 2008, Abe.

U.S. Appl. No. 12/123,201, filed May 19, 2008, Suzuki, et al.

Office Action issued Jun. 7, 2011, in Japanese Patent Application No. 2009-223762.

* cited by examiner

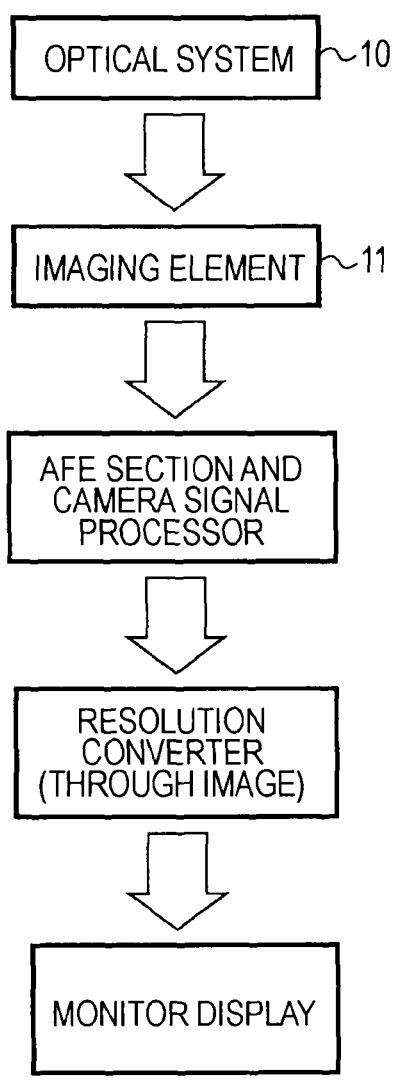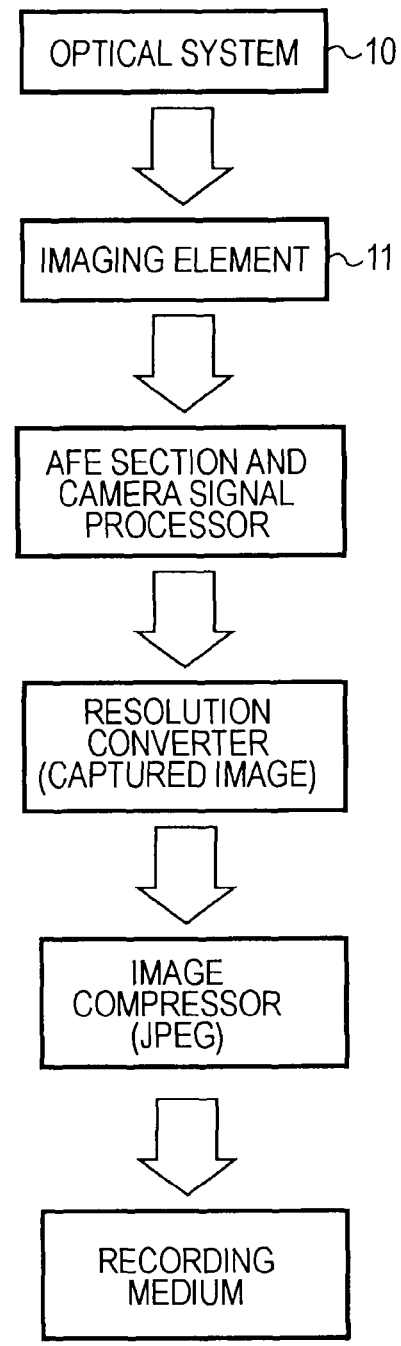

IMAGING DEVICE, IMAGING METHOD AND COMPUTER PROGRAM

CROSS REFERENCES TO RELATED APPLICATIONS

The present invention contains subject matter related to Japanese Patent Application JP 2007-156066 filed in the Japanese Patent Office on Jun. 13, 2007, the entire contents of which are incorporated herein by reference.

BACKGROUND OF THE INVENTION

1. Field of the Invention

The present invention relates to an imaging device, an imaging method and a computer program for capturing an image containing an image of a person as a subject. In particular, the present invention relates to an imaging device, an imaging method and a computer program for performing automatic camera work in response to recognition of a particular pattern from a subject represented in the image.

The present invention further relates to an imaging device, an imaging method and a computer program for automatically determining a photographing timing in response to a recognition of a smiling face of the subject contained in the image. In particular, the present invention relates to an imaging device, an imaging method and a computer program for determining a photographing timing by detecting a smiling face of an appropriate subject with an input image showing a plurality of subjects.

2. Description of the Related Art

Cameras have a long history serving as means for recording visual information. Currently, digital cameras are replacing silver-salt cameras using a photographing plate or film and are in widespread use. The digital camera captures an image with a solid-state imaging element such as a charge-coupled device (CCD) or a complementary metal-oxide semiconductor (CMOS) device and analog-to-digital converts the image. The digital camera stores a digital encoded image onto a memory and performs an image processing operation and an image management on the image with a computer. Such a digital camera is free from the limitation of service life of films.

The silver salt camera and the digital camera are substantially identical to each other in basic camera work. The digital camera incorporates advanced automatic technique in camera work. Even an inexperienced user is unlikely to fail to photograph.

The digital camera has an auto focus (AF) function, an auto exposure (AE) function, and an image stabilization function. The digital camera has an advantage that the AF function and the AE function are performed not only by an optical system but also in digital processing. Furthermore, the digital camera performs appropriate color reproduction by image quality adjusting a captured image in digital processing. The digital processing includes multiplying the captured image by a white balance gain in an auto white balance function.

The auto focus and the image quality adjustment are performed with the camera focusing on at least one subject present within an image frame. Previously, the user manually sets an important subject. Currently, the digital camera incorporates photographing techniques of face detection. For example, the camera detects a face of a person from a captured image and automatically focuses on the detected face or automatically adjusts image quality with respect to the face.

Japanese Unexamined Patent Application Publication No. 2003-271933 discloses a technique of detecting a face from a captured image signal. In accordance with the disclosure, an average face image serves as a template to be checked against an input image signal for matching. Such a technique is widely known. A face slant in the captured image is difficult to detect. In such a case, an angle of the face is detected, the image of the face is rotated in accordance with the detected angle value and then the matching process is performed. Japanese Unexamined Patent Application Publication No. 9-171560 discloses a technique of detecting an angle of a face. In accordance with disclosure, the centerline of the face is detected and the likeliness of the centerline is calculated based on left-right symmetry of the face. The angle of the centerline having a high likeliness is output as the angle of the face.

Auto shutter for determining a photograph timing based on a recognition of a particular pattern of a subject image such as a smiling face has been recently studied and developed.

Japanese Unexamined Patent Application Publication Nos. 2000-347278, 2004-294498 and 2006-237803 have disclosed cameras that output a photographing timing signal when a predetermined photographing condition is satisfied. Such a camera determines whether a main subject satisfies the predetermined photographing condition within an area of interest contained in the main subject to be photographed. The areas of interest may include a shape and color of the eyes and the mouth of a person if the person is photographed and feather of a bird if the bird is photographed.

Factors serving as specific photographing timing may be conditions to make a person look good in photo, such as "remaining unblinking," "looking at the camera," and "smiling." In related art, retouching techniques have been long available to modify a photo of a person to make the person look good. However, it is difficult to modify a photo of a person blinking to a photo of the person remaining unblinking or to modify a photo of a person with a smiling face to a photo of the person with an unsmiling face. This is one reason why a smiling face is one photographing condition.

The photographing condition of "smiling" is determined based on image information related to an area of the white of the eyes in the subject, the horizontal length of the mouth of the subject, and an area of white portions in the mouth. If a plurality of subjects are shown in an image frame input via an imaging element, it is not known which one of the subjects is to be used to determine the photographing timing.

Japanese Unexamined Patent Application Publication No. 2006-33437 discloses a digital camera that detects a plurality of faces. In accordance with the disclosure, an outline is set up on the largest face or the closest face in an AF area. When face detection is performed using a through image, the through image is increased in luminance to facilitate face detection to a level higher than luminance used when no face detection is performed. The digital camera does not perform an automatic photographing operation based on smiling face detection. The detected face set within the AF area is automatically determined by the camera. The user cannot specify a subject having a smiling face the user is interested in.

Japanese Unexamined Patent Application Publication No. 2006-145629 discloses an imaging device. In accordance with the disclosure, the imaging device performs a focus adjustment so that a focusing lens focuses on a face closest to the imaging device from among detected faces. An outline surrounding the focused face is displayed on a liquid-crystal display. If the face surrounded by the outline is not a desired person's face, the user may change the outline onto another face using cross keys. The imaging device performs auto focus process by determining a main subject with respect to the face closest to the imaging device, but does not perform the auto focus process based on smiling face detection. The imaging device allows the user to specify a subject desired by him or her, but the user can specify only a particular subject.

The auto focus process is performed, basically focusing on a single point although the manner of focusing depends on characteristics of an optical system, such as focus depth. The imaging device cannot focus on a plurality of subjects at a time. The auto focus process may be performed based on the smiling face detection. For example, persons in an event such as a party may be photographed in a relatively large viewing angle. In such a case, the photographing condition may be that all members in the party are smiling instead of any particular single person smiling. The automatic photographing operation based on the smiling face detection is substantially different from the automatic photographing operation based on auto focusing.

SUMMARY OF THE INVENTION

It is thus desirable to provide an excellent imaging device, an excellent imaging method and a computer program for automating camera work in response to a recognition of a particular pattern from a subject contained in a captured image.

It is also desirable to provide an excellent imaging device, an excellent imaging method and a computer program for determining automatically an appropriate photographing timing in response to the recognition of a smiling face from a subject contained in the captured image.

It is also desirable to provide an excellent imaging device, an excellent imaging method and a computer program for determining automatically an appropriate photographing timing by detecting a smiling face of an appropriate one of a plurality of subjects contained in the captured image.

In accordance with one embodiment of the present invention an imaging device, includes an image input unit for inputting an image of a subject, an image signal processing unit for processing the input image, a display unit for displaying on a display screen an input image processed by the image signal processing unit, a face detection unit for detecting a face of the subject from the input image processed by the image signal processing unit, a target face setting unit for setting one of the faces, detected by the face detection unit, as a smiling face detection target, a display control unit for displaying, on a through image displayed by the display unit, the detected face set by the target face setting unit in a manner such that the set detected face is distinctly different from the other detected faces, and a detection face changing unit for changing the smiling face detection target to another detected face in response to a user operation performed on the display screen that displays the detected face set as the smiling face detection target and the other detected faces in the distinctly different manner.

The imaging device detects the degree of smile of the detected face set as the smiling face detection target, and performs the photographing operation when the degree of smile detected reaches the smile detection threshold level. Another operation may also be performed in response to smiling face detection results.

The imaging devices such as digital cameras are in widespread use, and techniques for automating camera work have also been developed. Research and development have been performed on auto shutter function of the automated camera work. The auto shutter function determines photographing timing using a particular pattern in an image of a smiling person (subject). Factors serving as specific photographing timing may be conditions to make a person look good in photo, such as "remaining unblinking," "looking at the camera," and "smiling."

If a plurality of subjects are contained in an image frame input from an imaging element, the problem is which one of the subjects is to serve as a smiling face detection target in photographing timing control.

The imaging device allows the user to select any subject the user desires. More specifically, the imaging device sets as the smiling face detection target the face from among the faces detected by the face detection unit and displays on a on-screen display (OSD) the detected face set by the face detection unit and the other detected face in the distinctly different manner. The imaging device changes the smiling face detection target to another detected face in response to the user operation performed on the display screen.

When the face detection unit detects a plurality of faces from the input image, the target face setting unit may determine importance of each detected face based on a position and other information relating to the detected face in the input image, prioritize the detected faces according to the importance of the respective detected faces, and set as a smiling face detection target each of the detected faces of a predetermined number starting with the one having the highest priority.

The display control unit may display the through image with the outline attached to the detected face set as the smiling face detection target so that the user such as a photographer may view the detected face. The display control unit may display the through image with an outline attached to the detected face set as the smiling face detection target, wherein the through image is displayed with the outline thereof changed in a display mode or with an accompanying predetermined icon.

If at least two detected faces are set as the smiling face detection targets, the imaging device may automatically perform the photographing operation in response to a detection of at least one smiling face or in response to a detection of the smiling faces of all selected N persons.

The display unit may include a touchpanel and the detection face changing unit may change the smiling face detection target to another detected face in response to a user operation performed on the touchpanel.

The face detection unit may detect a plurality of faces from the input image, and attach an operation order to each detected face. The target face setting unit may set the plurality of detected faces as smiling face detection targets in accordance with importance of each detected face. The detection face changing unit may identify in the operation order a detected face specified by a user with an ordinary directional operation key such as one of up, down, left and right keys and set the identified detected face as a smiling face detection target with the priority order of the detected face promoted.

If a plurality of detected faces are set as the smiling face detection targets, a detected face specified by the user using the touchpanel is promoted in priority order to be set as the smiling face detection target.

If a plurality of detected faces are set as the smiling face detection targets, a detected face in an area specified by the user using the touchpanel is promoted in priority order to be set as the smiling face detection target.

If the number of subjects as smiling face detection targets is limited to N, and if detected faces of more than N are contained in the area on the display screen specified by the user with the touchpanel, the detection face changing unit may determine the importance of each of the detected faces within the area, prioritize each detected face in accordance with the importance thereof, and set the N detected faces as smiling face detection targets starting with the one having the highest priority.

The imaging device of embodiments of the present invention allows the user to detect freely a smiling face and to select the subject having the smiling face. The user can specify a subject as a smiling face detection target on the touchpanel displaying the through image. The imaging device thus displays on the through image a subject as the smiling face detection target and a subject as no-target detected face in the distinctly different manner. For example, when persons in an event such as a party are photographed in a relatively large viewing angle, the auto photographing operation may be performed in response to smiling face detections on condition that all members in the party are smiling.

In accordance with one embodiment of the present invention, a computer-readable computer program causing a computer to perform a photographing operation on an input image of a subject, includes steps of processing the input image, displaying on a display screen the processed input image, detecting a face of the subject from the processed input image, setting one of the detected face as a smiling face detection target, displaying, on a through image displayed on the display screen, the detected face set in a manner such that the set detected face is distinctly different from the other detected faces, and changing the smiling face detection target to another detected face in response to a user operation performed on the display screen that displays the detected face set as the smiling face detection target and the other detected faces in the distinctly different manner.

The computer program is described in a computer readable format to be executed on a computer. By installing the computer program on the computer, the computer can work in the same manner as the above-described imaging device.

In accordance with one embodiment of the present invention, an appropriate photographing timing is determined based on the recognition of the smiling face of the subject contained in the image.

In accordance with one embodiment of the present invention, the smiling face detection is performed on an appropriate subject if a plurality of subjects are contained in the image and the appropriate photographing timing is automatically determined.

The imaging device of embodiments of the present invention allows the user to detect freely a smiling face and to select the subject having the smiling face. The user can specify a subject as a smiling face detection target on the touchpanel displaying the through image. The imaging device thus displays on the through image a subject as the smiling face detection target and a subject as non-target detected face in the distinctly different manner. For example, when persons in an event such as a party are photographed in a relatively large viewing angle, the auto photographing operation may be performed in response to smiling face detections on condition that at least two members in the party are smiling.

These and other objects, features and advantages will become apparent from the following description of the embodiments of the present invention with reference to the accompanying drawings.

BRIEF DESCRIPTION OF THE DRAWINGS

FIG. 2 diagrammatically illustrates a data flow of a camera image as a through image displayed on a monitor display;

FIG. 3 diagrammatically illustrates a data flow in which the digital still camera performs a photographing operation;

DESCRIPTION OF THE PREFERRED EMBODIMENTS

The embodiments of the present invention are described below with reference to the drawings.

Figure 1:
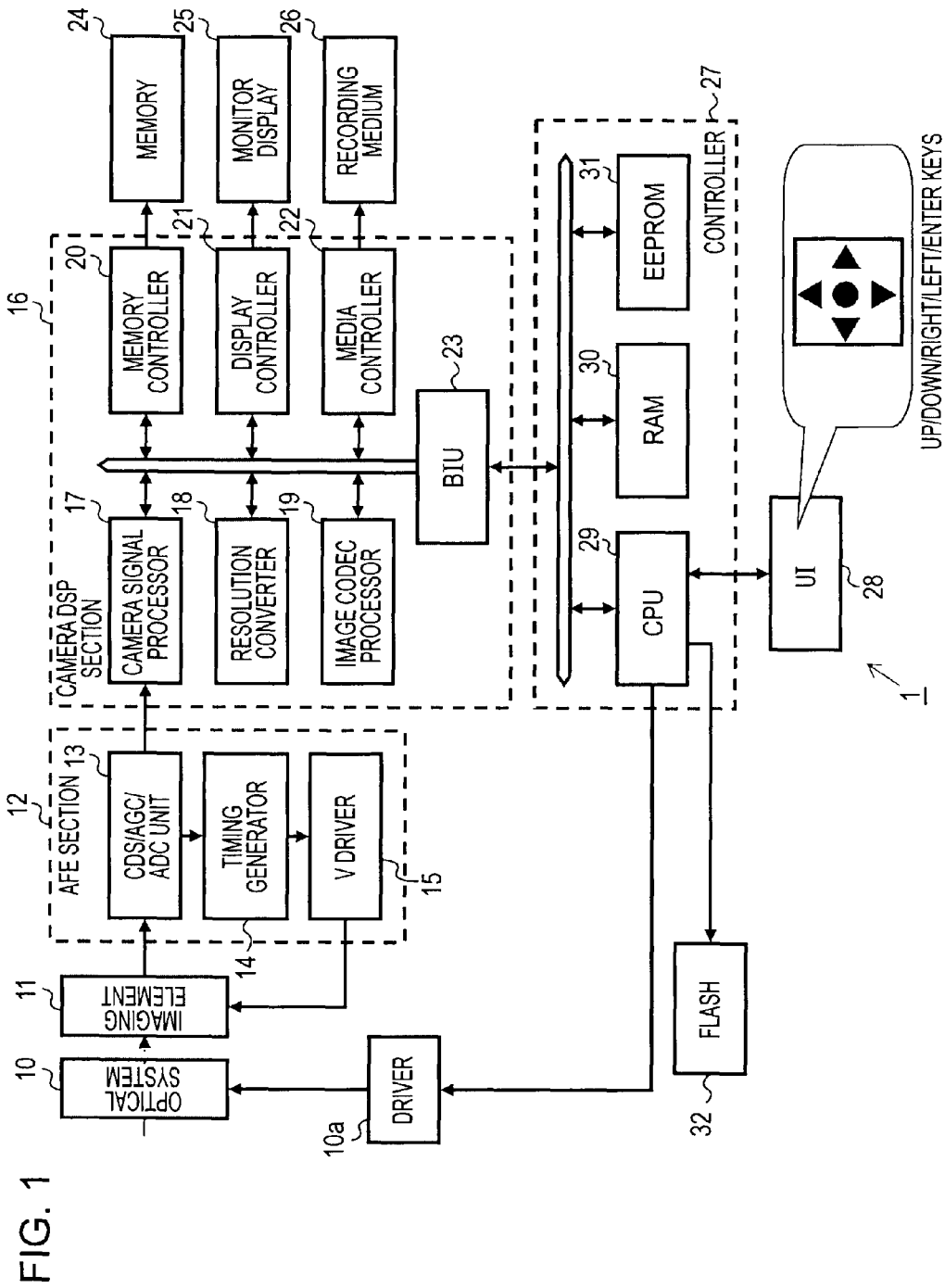
FIG. 1 diagrammatically illustrates a hardware structure of a digital still camera in accordance with one embodiment of the present invention.

FIG. 1 illustrates a hardware structure of a digital still camera 1 in accordance with one embodiment of the present invention. The digital still camera 1 includes an imaging element 11, an analog front end (AFE) section 12 and a camera digital signal processor (DSP) section 16. The digital still camera 1 digital processes an image input through an optical system 10 and records the processed image.

The optical system 10 includes a lens for collecting a light beam from a subject on the imaging element 11, a drive mechanism for moving the lens for focusing and zooming, a shutter mechanism for allowing the light beam from the subject to be incident on the imaging element 11 for a predetermined duration of time in response to a shutter release operation, and an iris mechanism for limiting the light beam from the subject in terms of a direction and a cross-sectional area of the light beam (these mechanisms are not shown). The driver 10a controls each mechanism in the optical system 10 in response to a control signal from a central processing unit (CPU) 29 to be discussed later.

The imaging element 11 includes a matrix of pixels, each having a photoelectric conversion effect (such as one of a charge-coupled device (CCD) and a complementary metal oxide semiconductor (CMOS)). The imaging element 11 converts the incident light beam from the subject into an electrical signal. The imaging element 11 includes on a light receiving portion thereof a plate having a green (G) segment checker board pattern with RB segment coded. A signal charge responsive to an amount of incident light having passed through each color filter is accumulated in each pixel and color of each incident light beam at each pixel position is reproduced from the tri-color signal charges read from the pixels. An analog image signal output from the imaging element 11 is each of the RGB tri-color signals. Alternatively, the analog image signal may be each of complementary color signals.

The analog front end section 12 is an integrated circuit (IC) chip and includes a CDS/AGC/ADC unit 13, a timing generator 14 and a V driver 15.

After reducing low-level noise in the image signal from the imaging element 11, the CDS/AGC/ADC unit 13 performs correlated double sampling (CDS) and sample holds the image signal, performs an automatic gain control (AGC) process on the image signal, and then analog-to-digital converts the image signal into a digital image signal.

The timing generator 14 generates a timing pulse signal driving the imaging element 11. In response to the timing pulse signal, the V driver 15 outputs a drive signal for outputting charges from pixels in the imaging element 11 on a line-by-line basis in a vertical direction.

The camera DSP section 16 has a single-chip structure and includes a camera signal processor 17, a resolution converter 18, an image codec processor 19, a memory controller 20, a display controller 21 and a media controller 22.

The camera signal processor 17 performs a pre-process including pixel defect correction, digital clamp, and digital gain control on the image signal from the analog front end section 12. The camera signal processor 17 performs white-balance gain control process on the pre-processed image signal with AWB function while also performing an image quality correction process including sharpness, color saturation, contrast adjustments on the image signal. An appropriate color state is thus reproduced. The camera signal processor 17 generates RGB image signals through a demosaic process. The image quality correction process may include flash level and red eye reduction adjustments. The camera signal processor 17 further performs γ correction on the RGB image signals, thereby converting image information into a signal in gradations appropriate for monitoring, printout, or video recording. The camera signal processor 17 detects luminance information from an output image signal from the analog front end section 12. More specifically, the camera signal processor 17 performs histogram detection to detect a histogram on a per predetermined range basis and color detection to detect color information on a per predetermined range basis. The histogram detection results and the color detection results are output to a controller 27 to be discussed later.

The resolution converter 18 converts a size of the image. The image codec processor 19 color-space converts the RGB image signals into a luminance signal and color difference signals (Y, Cr and Cb) and also performs compression encoding process including joint picture experts group (JPEG) compression and moving picture experts group (MPEG) compression.

The memory controller 20 controls an access operation to read and write data of captured image information onto a memory 24 including a synchronous DRAM (SDRAM).

A monitor display 25 includes a flat display panel of liquid-crystal display or other type. The display controller 21 controls the monitor display 25. The display controller 21 converts image data (through image) output from the camera signal processor 17 and image data stored on the memory 24 into a signal to be displayed on the monitor display 25 and then outputs the signal to the monitor display 25.

The monitor display 25 displays a through image. The monitor display 25 further displays as an on-screen display (OSD) a menu screen and a variety of setting screens and a variety of warning information in response to a request from the controller 27. The monitor display 25 displays on one of the OSD setting screens a detection outline that identifies a subject specified as a smiling face detection target by a user. The monitor display 25 also displays the detection outline with a subject set as a smiling face detection target and a subject as a non-target subject displayed in a distinctly different manner.

In accordance with one embodiment of the present invention, a touch sensor overlaid on the surface of the monitor display 25 serves as a touchpanel. The coordinates recognized by the touchpanel are substantially identical to the coordinates displayed on the display panel. The user can thus directly point to a subject as a smiling face detection target and other graphic user interface (GUI) components.

The media controller 22 has a slot receiving a removable recording medium 26 such as a memory stick (Registered Trademark) and reads and writes data on the recording medium 26. For example, the media controller 22 records a captured image file stored on the memory 24 onto the recording medium 26.

The camera DSP section 16 is connected to the controller 27 via a bus interface unit (BIU) 23. The controller 27 includes a user interface (UI) 28, a CPU 29 generally controlling operation of the digital still camera 1 in response to a user operation, a random-access memory (RAM) 30 serving as a main memory for the CPU 29, and an electrically erasable and programmable read-only memory (EEPROM) 31 storing program code and device information in a non-volatile fashion.

The CPU 29 detects a smiling face of a subject using an image, resolution converted by the resolution converter 18. The CPU 29 performs a GUI process for displaying an OSD on the monitor display 25. In accordance with one embodiment of the present invention, the GUI process includes displaying the detection outline identifying a subject specified as a smiling face detection target by the user. The GUI also includes displaying the detection outline with a subject as a smiling face detection target and a non-target subject in a distinctly different manner.

The UI 28 has an operation function with which the user can input an instruction and an output function as a loudspeaker and a light-emitting diode (LED) lamp. To perform the operation function, the UI 28 includes a shutter release button and keys and dials for a variety of settings including flash on and off. A control signal in response to a user operation on these controls is input to the CPU 29. In accordance with one embodiment of the present invention, the UI 28 includes five operation (cross) keys, i.e., up, down, left and right keys and a center enter key surrounded by those four keys.

In the output function, the UI 28 feeds back, to the user, information related to camera work, using an alarm audio sound and lighting or blinking of the LED.

A flash section 32 flashes a light in response to flash control information from the controller 27.

In the digital still camera 1, signals successively received and then photoelectrically converted by the imaging element 11 are fed to the analog front end section 12. After being CDS processed and AFE processed, the resulting signal is analog-to-digital converted. The camera signal processor 17 image-quality corrects the digital image signal supplied from the analog front end section 12 and then converts the image-quality corrected signal into a luminance (Y) signal, and difference (R-Y and B-Y) signals.

The display controller 21 converts the image data output from the camera signal processor 17 into an image signal. The monitor display 25 then display the through image responsive to the image signal.

FIG. 2 illustrates a data flow of a camera image displayed on the monitor display 25.

Information relating to the subject is converted into a digital signal through the optical system 10, the imaging element 11 and the analog front end section 12 and the resulting digital signal is then supplied to the camera DSP section 16. The camera DSP section 16 performs an image signal process, thereby correcting brightness and color. The camera DSP section 16 further performs resolution conversion on the image. The resulting image is then displayed on the monitor display 25. The CPU 29 in the controller 27 controls such an image output process by performing a predetermined program code. The image output control process is actually divided into small job segments. Since such job segments are not closely related to the present invention, the discussion thereof is omitted here.

When a user operation instruction is input to the controller 27 via the UI 28 to instruct the controller 27 to record an image, image data from the camera signal processor 17 is supplied to the image codec processor 19. The image codec processor 19 performs a predetermined compression encoding process on the image data, and the compression encoded image data is stored onto the memory 24 via the memory controller 20 or recorded onto the recording medium 26 via the media controller 22. When a still image is recorded, the camera signal processor 17 supplies the image data of one frame to the image codec processor 19. When a moving image is recorded, processed image data is continuously supplied to the image codec processor 19.

Figure 4:
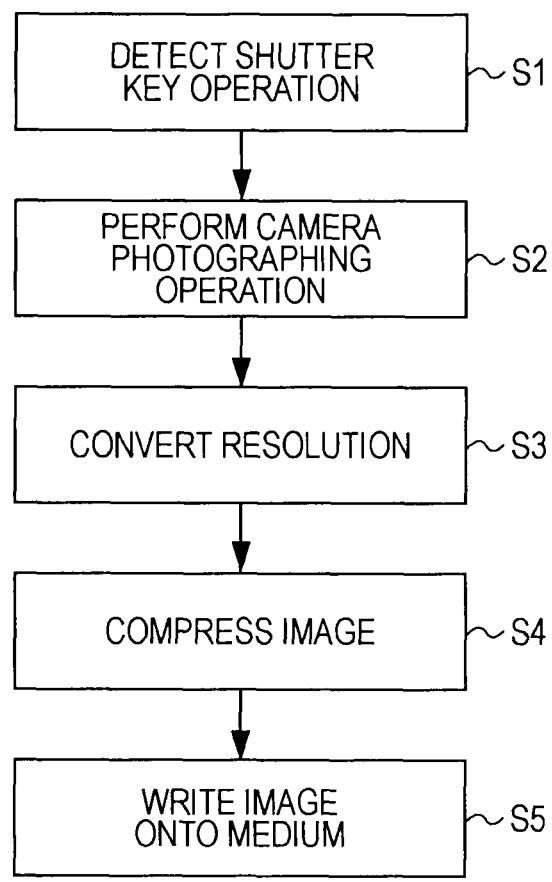
FIG. 4 is a flowchart illustrating a process of the digital still camera performing the photographing operation.

FIG. 3 diagrammatically illustrates a data flow of a photographing operation of the digital still camera 1. FIG. 4 is a flowchart of the photographing operation of the digital still camera 1.

In the same way as described with reference to FIG. 2, the subject is displayed on the monitor display 25. When the user presses the shutter key on the UI 28 (step S1), the UI 28 detects the pressed key and sends a signal of key information to the CPU 29. In response, the CPU 29 outputs a control signal to the driver 10a and performs the photographing operation (step S2). The AF process and the AE process are also performed together.

When a command to perform the photographing operation is issued via the driver 10a, information relating to the subject is converted into a digital signal via the optical system 10, the imaging element 11 and the analog front end section 12. The resulting digital signal is then supplied to the camera DSP section 16. The camera DSP section 16 performs the image signal process, thereby correcting brightness and color on the image signal. The camera DSP section 16 also performs the resolution conversion on the image signal, thereby converting the image signal into an image size appropriate for a photographing mode (step S3). The image codec processor 19 performs the JPEG compression process on the image (step S4). The JPEG compressed image is then recorded on the recording medium 26 via the media controller 22 (step S5).

The digital still camera 1 of one embodiment of the present invention performs the auto shutter function. With the auto shutter function, the digital still camera 1 determines the photographing timing based on a particular pattern recognized from the image of a smiling person (subject). The smiling face recognition may be performed by the CPU 29 that performs an image recognition processing program. The smiling face recognition may be performed by an image recognition processing engine (not shown) that is incorporated in the controller 27. The smiling face recognition technique may be any one disclosed in the related art and the discussion thereof is omitted.

In the photographing operation, the digital still camera 1 may notify the subject of the photographing timing using the output function of the UI 28. More specifically, the digital still camera 1 generates an alarm sound or lights or blinks the lamp to notify the subject of the photographing timing.

Figure 5:
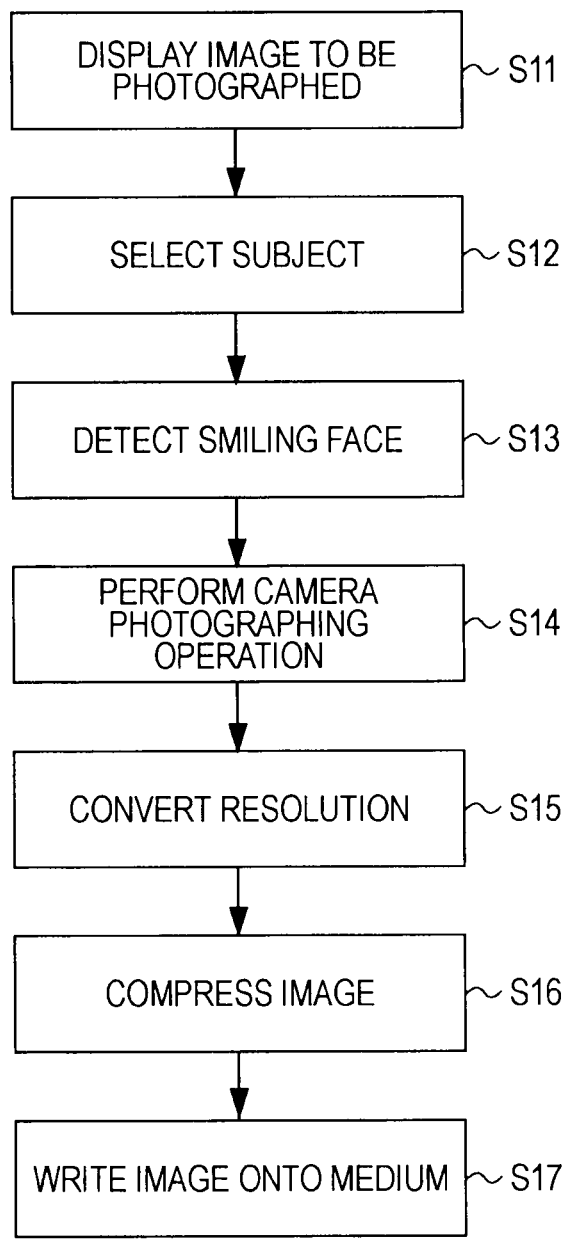
FIG. 5 is a flowchart illustrating a process of the digital still camera that performs an auto photographing operation based on smiling face detection while notifying a person as a subject of a photographing timing.

The digital still camera 1 of one embodiment of the present invention performs the auto photographing operation in response to the detection of the smiling face of the subject. FIG. 5 is a flowchart of the auto photographing operation performed in response to the detected smiling face by the digital still camera 1.

In accordance with the data flow of FIG. 2, the camera image input via the optical system 10 is displayed on the monitor display 25 (step S11). The image then displayed is also supplied to the controller 27.

In accordance with one embodiment of the present invention, the user can detect faces of subjects and select any subject having a smiling face the user desires to photograph (step S12). More specifically, the user specifies a subject as a smiling face detection target on the monitor display (touch-panel) 25 displaying the through image.

The CPU 29 (or an image recognition engine (not shown)) performing a predetermined image recognition processing program detects the degree of smile of the subject specified in step S12 (step S13). The detection outline identifying the specified subject is displayed on OSD on the monitor display 25 in response to the specifying operation of the user. The outline is displayed in a manner that distinctly discriminates between the subject as the smiling face detection target and the non-target subject.

When the user presses the shutter key on the UI 28, the camera photographing operation starts (step S14). More specifically, the CPU 29 issues via the driver 10a a command to start the photographing operation. The information relating to the subject is thus converted into a digital signal through the optical system 10, the imaging element 11 and the analog front end section 12. The resulting digital signal is then supplied to the camera DSP section 16. The camera DSP section 16 performs the image signal process, thereby correcting brightness and color of the digital signal. When the auto photographing function is enabled based on the smiling face detection, a shutter release operation is not immediately activated in response to the pressing of the shutter key. Instead, the camera photographing operation starts at the moment the degree of smile of the subject reaches a predetermined smiling face detection threshold.

The shutter key is pressed or the camera photographing operation is activated in response to the face detection results. The resolution converter 18 then converts the image into an image size matching a photograph mode (step S15). The image codec processor 19 performs the JPEG compression process on the image (step S16). The media controller 22 then records the image onto the recording medium 26 (step S17).

With the digital still camera 1, the user can specify any subject as a smiling face detection target. The user may even specify two or more subjects as smiling face detection targets. A subject as a smiling face detection target and a non-target subject may be displayed on the through image in a distinctly different manner from each other. The photographing operation is automatically triggered at the moment a predetermined photographing condition becomes satisfied by the degree of smile of the subject obtained from the through image. The photographing operation responsive to the smiling face detection is described below. It is contemplated that an image recognition engine can be mounted in the controller 27 to detect the subjects' faces and the smiling face of any of the subjects. However, for convenience of explanation, these processes are performed by the CPU 29 here.

(1) Face Detection Process

The resolution converter 18 converts the camera signal in resolution into image data as a through image. The resulting image data is supplied to the CPU 29 that is to execute a predetermined image recognition program. For example, the CPU 29 detects a face by performing a pattern detection, namely, extracts a face region of each subject in an image frame. The present invention is not limited to any particular face detection process. For example, a face detection algorithm disclosed in a paper entitled "Learning Process of Real Time Face Detector Detecting Face At Any Posture Using Pixel Difference Feature" 10th Image Sensing Symposium (SSII 2004) may be used.

To detect face, the entire image is scanned after being converted in resolution. If a large number of subjects are contained in the image, it is difficult to correct all detected faces and smiling faces. The detected faces are thus prioritized and a detected face having a higher priority may be specified as a smiling face detection target.

In the prioritization, subjects are scored in terms of the importance thereof base on information such as a size of each face region. The higher the score, the higher the priority.

Figure 6:
FIG. 6 illustrates the through image with an outline attached to a detected face set as a smiling face detection target.

In order for the user to know the face as the smiling face detection target from among the current detected faces, the subject as the smiling face detection target and the non-target subject are preferably displayed in a distinctly different manner on the through image. To discriminate the subject as the smiling face detection target from the non-target subject, displaying only the outline of the subject as the smiling face detection target is contemplated. FIG. 6 illustrates an example of the through image in which only the outlines of the subjects as the smiling face detection targets are displayed.

Figure 7:
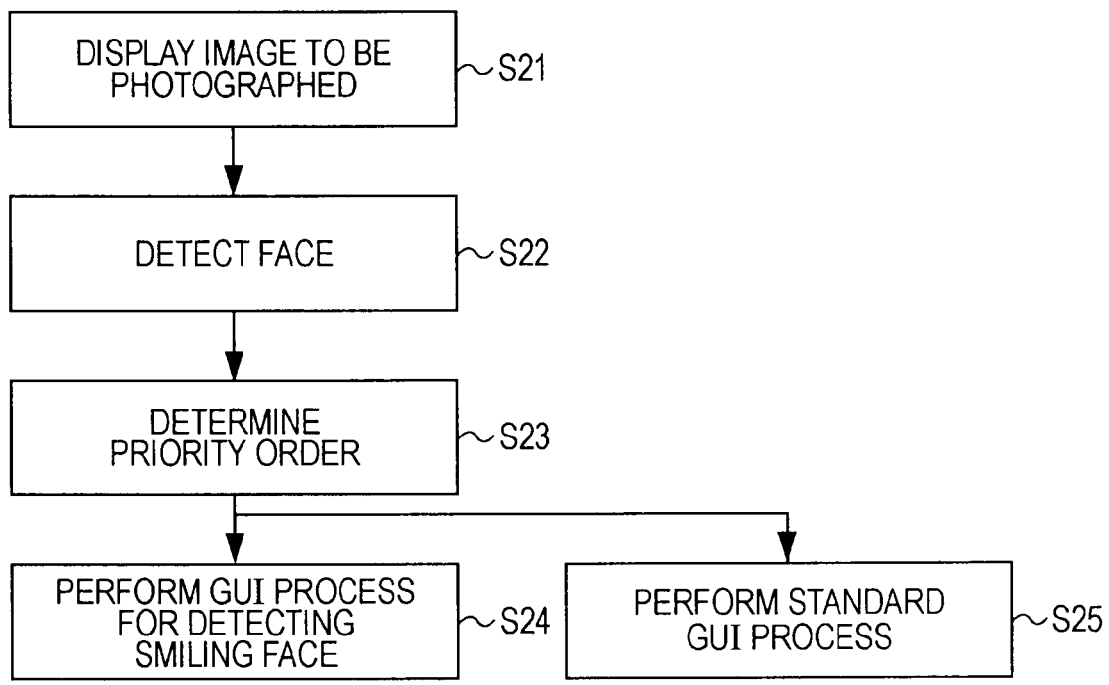
FIG. 7 is a flowchart illustrating a process for displaying an outline on the detected face set as the smiling face detection target.

FIG. 7 is a flowchart of a process for illustrating an outline of a detected face as a detection target. N subjects are set as smiling face detection targets (N is a positive integer).

In accordance with the data flow of FIG. 2, the camera image input from the optical system 10 is displayed on the monitor display 25 (step S21). The information of the through image to be displayed is also supplied to the controller 27.

The CPU 29 in the controller 27 performing the predetermined face detection program detects face from the information of the through image (step S22). If the M faces are detected (with M being a positive integer greater than N), the CPU 29 determines the importance of each detected face and prioritizes the detected faces with the determination results (step S23).

The detected faces having first through N-th priority orders are smiling face detection GUI processed, namely, outlines to the N detected faces on the OSD (step S24). On the other hand, the (N+1)-th through M-th priority orders are standard GUI processed (step S25).

Figure 8:
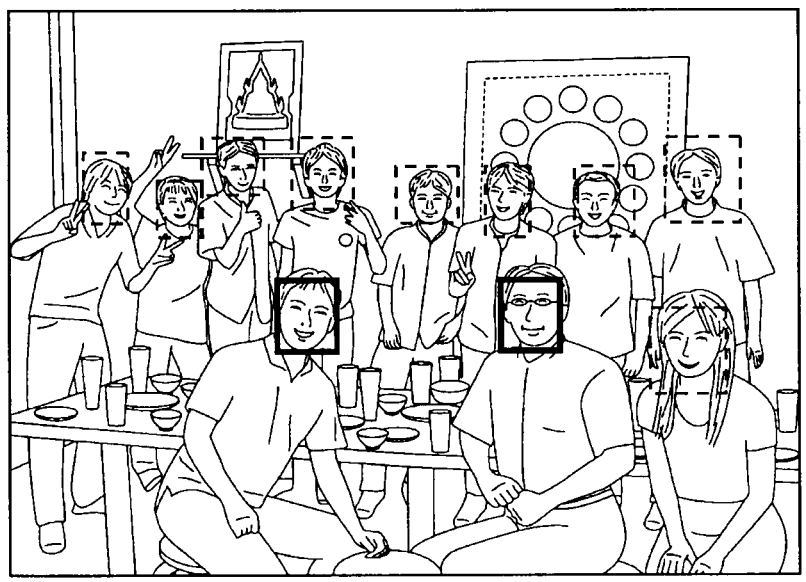
FIG. 8 illustrates the through image in which only the outline of detected faces selected as the smiling face detection targets are changed in display mode.
Figure 9:
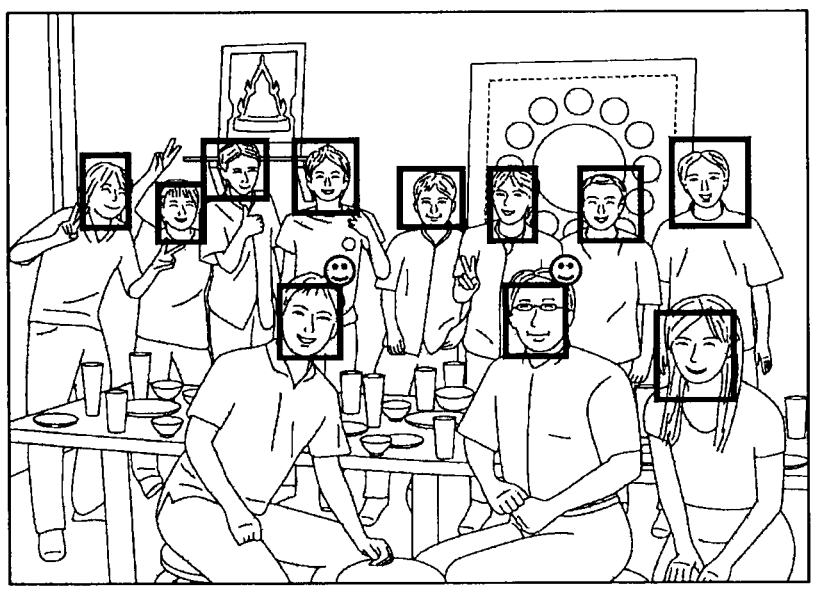
FIG. 9 illustrates the through image in which icons are attached to the outlines of the detected faces set as the smiling face detection targets.

All detected faces are accompanied by respective outlines. To discriminate the subject as the smiling face detection target from the non-target subject, the outlines of the detected faces selected as the smiling face detection targets are set to be different in a display mode (for example, attributes of line of the outline including color, thickness, and type of the line are changed) as shown in FIG. 8. Alternatively, each detected face as a smiling face detection target is accompanied by an icon as shown in FIG. 9. In the example of FIG. 8, the two persons on the front from the left are selected as the smiling face detection targets. The faces of the two persons are enclosed by bold outlines and the other faces are enclosed by thin broken outlines. As shown in FIG. 9, the two subjects from the left on the front are selected as the smiling face detection targets and only the detected faces of the two subjects are labeled icons indicating that the corresponding faces are selected.

Two methods of displaying the outline are considered. In a first method, the subjects are automatically selected as the smiling face detection targets. Subjects having an upper priority order are selected and displayed with the respective outlines. In a second method, all faces enclosed within a region are set as smiling face detection targets. In the second method, all the detected faces are surrounded by the respective outlines. Not only the user can recognize the detected faces as the smiling face detection targets but also the system recognize all the face-detected subjects.

(2) Smiling Face Detection Process

Several specifications of the digital still camera 1 of smiling face detection are contemplated. For example, smiling face detection is performed on each of a plurality of detected faces, and a plurality of smiling face detection results are statistically processed. For convenience of explanation, the digital still camera 1 automatically starts the photographing operation if and when a person having a face with the highest priority out of the detected faces starts smiling.

The smiling face detection process may be the same algorithm as the face detection process. For example, the face detection algorithm disclosed in the paper entitled "Learning Process of Real Time Face Detector Detecting Face At Any Posture Using Pixel Difference Feature" 10th Image Sensing Symposium (SSII 2004) may be used. In this case, however, a dictionary of images to be referenced is different.

When a smiling face of the detected face of the target subject is entered, the photographing operation starts. The photographing operation includes the resolution conversion of the input image to be captured, the JPEG image compression, and the recording of the compression encoded image onto the recording medium.

If M faces are detected from the input image, N persons are selected as the smiling face detection targets by prioritizing the M faces (M and N being positive integers and M being equal to or greater than N). N may be 2 or greater, i.e., a plurality of subjects as smiling face detection targets may be present. In one specification of the digital still camera 1, for example, the digital still camera 1 automatically performs the photographing operation if at least one smiling face is detected or if all N persons are detected as smiling. In this case, who N persons are from among M persons are determined depending on the prioritization method of the persons.

In this specification, the photographing operation is activated in response to the smiling face detection. Another process other than the photographing operation may also be performed in response to the smiling face detection.

(3) Selection of the Subjects

If a plurality of subjects are contained in an image frame input via the imaging element 11, the system automatically selects one subject as a smiling face detection target. The importance of each detected face is determined and the detected faces are prioritized based on the determination results. The detected face having the highest priority is specified as the smiling face detection target.

The user can specify a subject as a smiling face detection target on the through image displayed on the monitor display 25. The user may directly specify the subject on a display screen of the monitor display 25 as a touchpanel using a finger or a stylus. The user may also select the subject using the cross keys on the UI 28. The methods of specifying the subject are described below.

Figure 10:
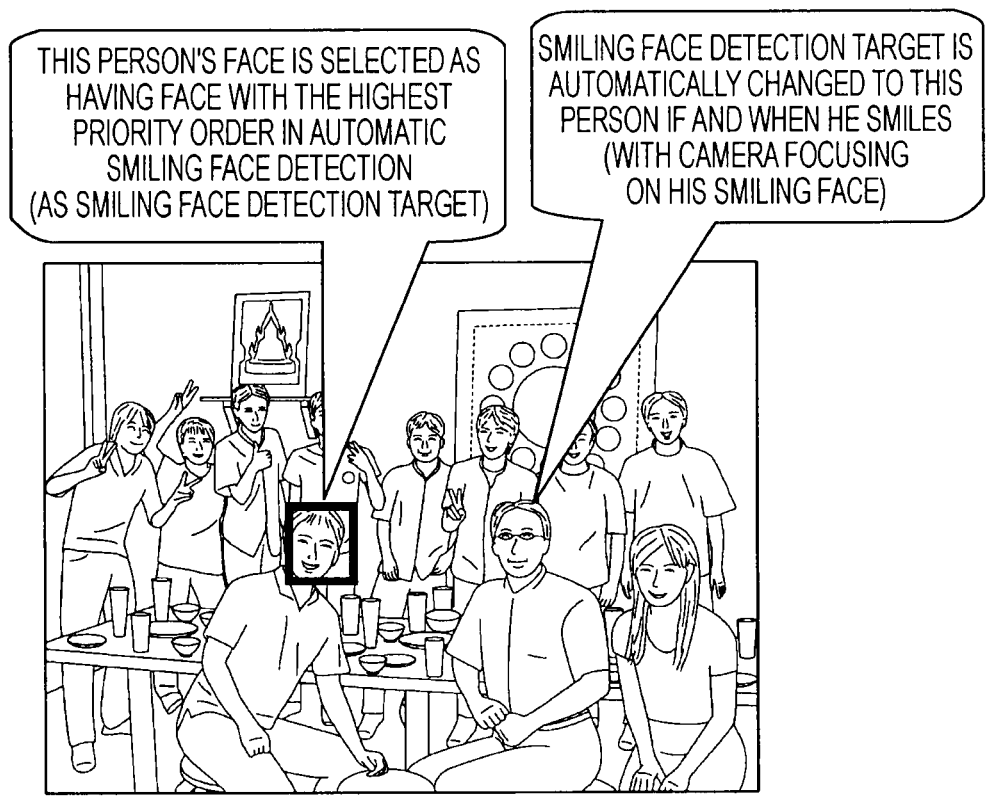
FIG. 10 illustrates an operation for changing the smiling face detection target from an automatically selected face to another detected face.

An operation of changing the smiling face detection target from an automatically selected face to another detected face is described below with reference to an input image of FIG. 10. As shown in FIG. 10, the detected face surrounded by the outline in an approximate center of the image is automatically selected as a smiling face detection target in accordance with the priority order. The user may now change the smiling face detection target to a subject next to the first subject on the front.

Figure 11:
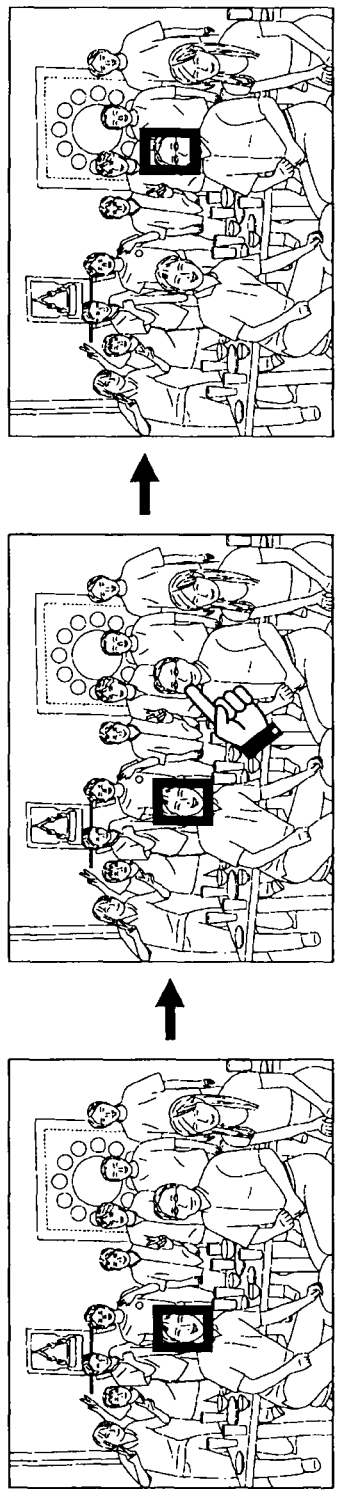
FIG. 11 illustrates an operation for changing the smiling face detection target from an automatically selected face to another detected face.

As shown in FIG. 11, the user touches an area close to the target face on the screen of the monitor display 25 as the touchpanel. The coordinates of the touched position on the screen are recognized. Face detection is performed in the vicinity of the coordinates through image pattern detection.

If a face is detected, the priority of the detected face is set to be the highest. The other detected faces are respectively demoted to lower priority by one notch.

An outline production process is performed on the face having now the highest priority in accordance with the new prioritization on the OSD. The resulting image is displayed on the OSD on the monitor display 25.

The face has been successfully detected by touching the screen. If no face has been detected in response to the touching operation, no changing is performed to the smiling face detection target.

Instead of using the touchpanel, the up, down, left and right keys arranged on the UI 28 may be used to select the subject as the smiling face detection target. Such an operation is described below.

Figure 12:
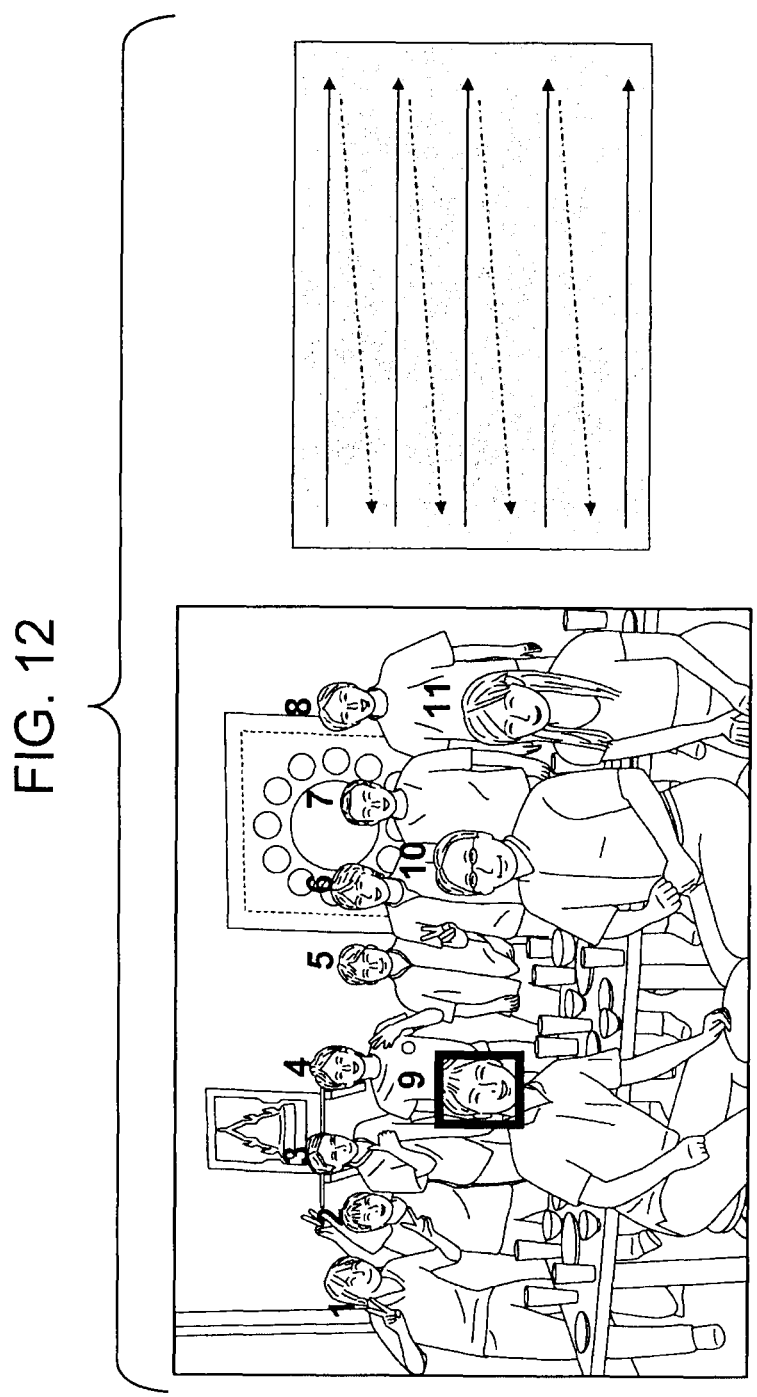
FIG. 12 illustrates a process for assigning an operation order of a key operation to each face detected from the image.

When the face detection process has been completed, an operation order for operating key is assigned to each detected face. FIG. 12 illustrates such an operation order assignment process. As shown in FIG. 12, the image is horizontally scanned from up to down, and each face is assigned operation order from left to right and from up to down.

When the user operates the up, down, left and right keys, the operation order of the detected faces is shifted by the number of operations. In this way, the detected faces as the smiling face detection targets are changed.

Figure 13:
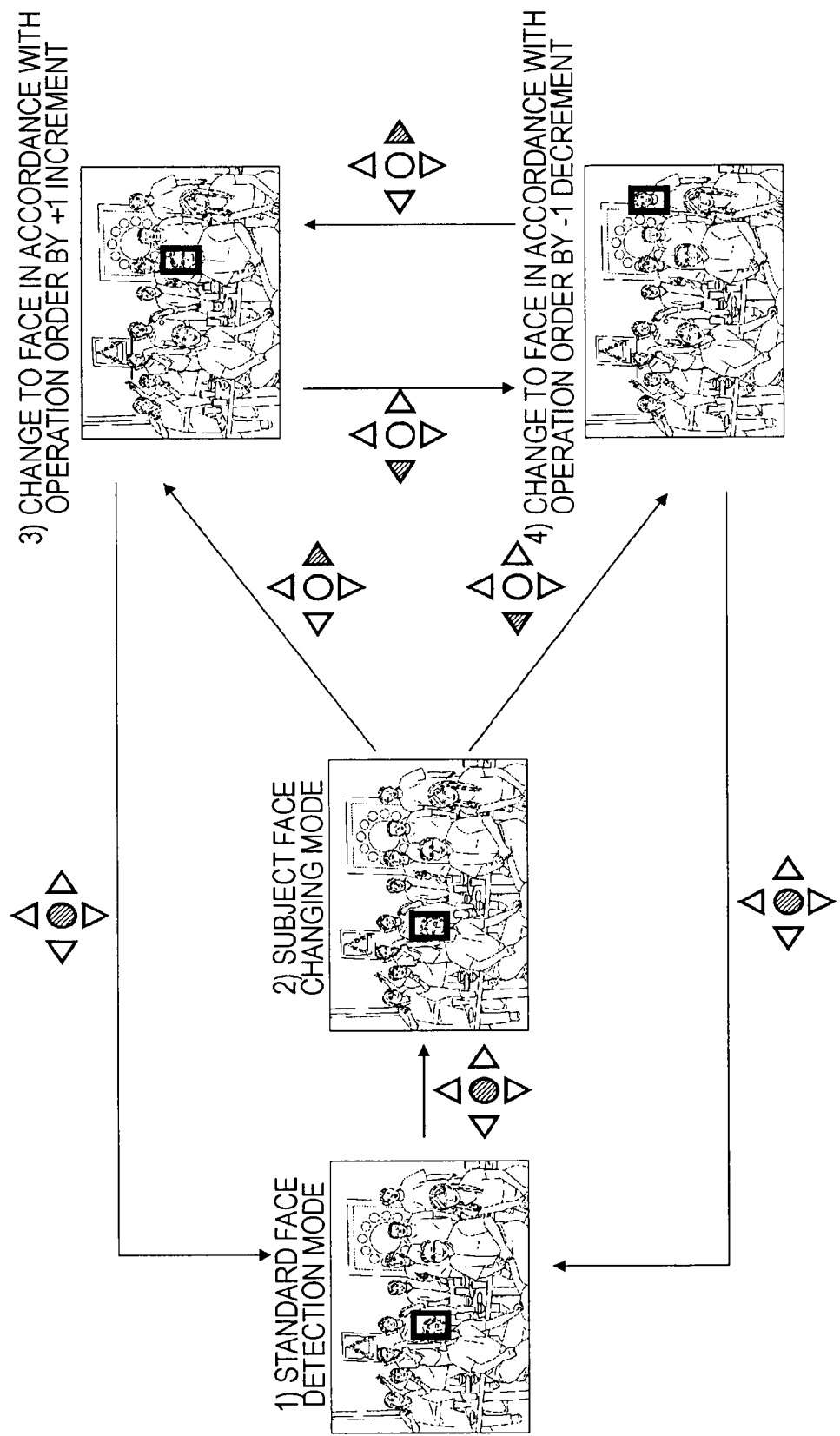
FIG. 13 illustrates screen updating in which a detection target changing process is performed in response to a key operation of each of up, down, left and right keys.

FIG. 13 illustrates screen updating in which a detection target changing process is performed in response to a key operation of each of the up, down, left and right keys. As shown in FIG. 13, an operated key is single-hatched. When the enter key in the center is selected after the operation order is assigned to a face, a smiling face detection target changing mode is entered. Face selection is incremented by one in the operation order by selecting the left key, or decremented by one in the operation order by selecting the right key. When changing is completed, the enter key is selected to determine the detected face as the smiling face detection target.

(4) A Plurality of Detected Faces as Smiling Face Detection Targets

In the above discussion, the number of detected faces as a smiling face detection target is one. A plurality of detected faces may be handled as the smiling face detection targets.

Figure 14:
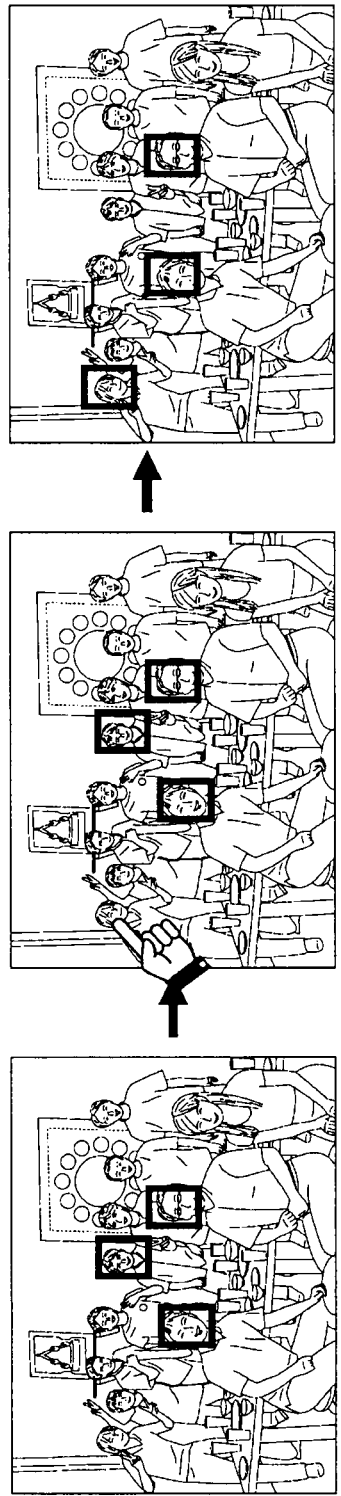
FIG. 14 illustrates screen updating in which the smiling face detection targets are set on three detected faces.

FIG. 14 illustrates screen updating in which a detection target changing process is performed with three detected faces being the smiling face detection targets.

Subsequent to the face detection, the prioritization is performed in accordance with an algorithm in which the subjects are scored in terms of importance of each subject based on information indicating, for example, that the subject is closer to the center of the screen or that the face region is large. The three subjects having an upper priority are selected as the smiling face detection targets. As shown in the left portion of FIG. 14, the detected faces are surrounded by the respective outlines on the screen of the monitor display 25.

As shown in the center portion of FIG. 14, the user points to an area close to a face of a subject that is unselected as a smiling face detection target and that the user intends to selects.

In response to the user operation, the CPU 29 prioritizes the subject desired by the user as having the highest priority. The CPU 29 then demotes the other subjects respectively to lower priority by one notch. As a result, a subject having had a third priority is demoted to a fourth priority, and thus falls outside the smiling face detection target range.

The upper three subjects are thus set as the smiling face detection targets in the new priority order. As shown in the right portion of FIG. 14, these detected faces are surrounded by the respective outlines. As shown in the right portion of FIG. 14, the back right subject is selected as having the highest priority in response to the user touch operation, the about center back subject falls outside the smiling face detection target range and the outline having surrounded that subject disappears.

(5) Selection Method of the Subject

In the above discussion, the subjects are selected one by one using the touchpanel or the left and right keys. The user may specify a plurality of faces by surrounding the plurality of faces on the touchpanel in a touch operation.

FIGS. 15A-15D illustrate screen updating in which two detected faces are specified as smiling face detection targets with the outlines attaching thereto.

The user surrounds the face desired as the smiling face detection target using the touchpanel in the touchpanel operation. The CPU 29 recognizes the area defined by the touched coordinates detected in position detection and detects face within the area through the image pattern detection.

If a face image is detected from the area defined in the touch operation, that face is prioritized with the highest priority. If a single face is detected from within the area, that face has the highest priority. If a plurality of faces are detected, the detected faces are prioritized in accordance with a predetermined algorithm. If the detected faces are above two (four faces as shown, for example), the detected faces down to the second priority are promoted in priority but the detected faces having the third priority or lower priorities are not promoted in priority. Along with the priority promotion, the subjects having been at the upper priority are respectively demoted in priority.

An outline production process is performed on the face having now the highest priority in accordance with the new prioritization. The resulting image is displayed on the OSD on the monitor display 25.

Figure 15A:
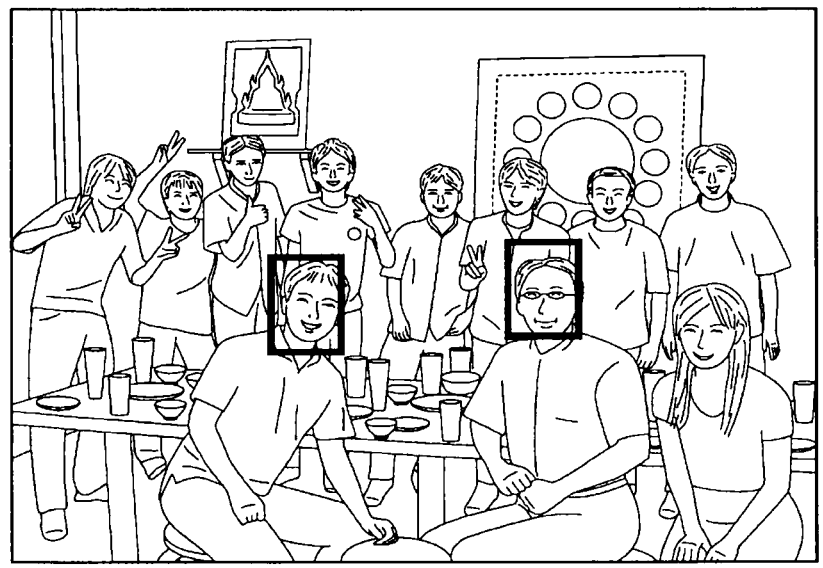
FIG. 15A illustrates screen updating in which a plurality of detected faces are concurrently specified as smiling face detection targets.

As shown in FIG. 15A, two subjects from the left on the front are selected as the smiling face detection targets.

Figure 15B:
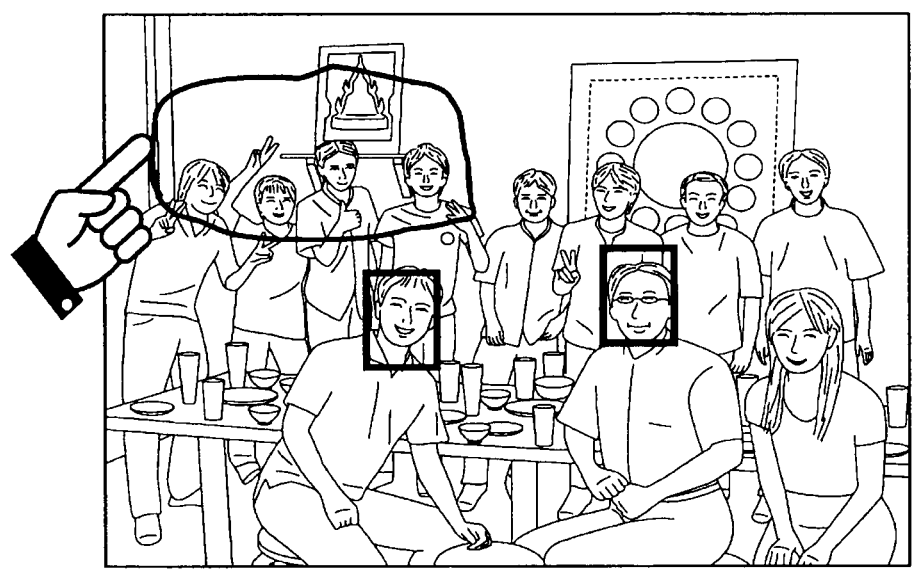
FIG. 15B illustrates screen updating in which a plurality of detected faces are concurrently specified as smiling face detection targets.
Figure 15C:
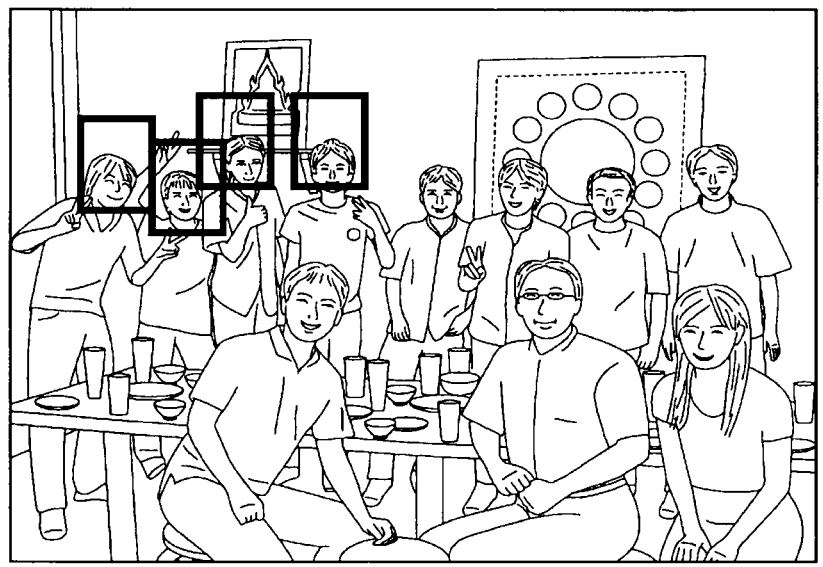
FIG. 15C illustrates screen updating in which a plurality of detected faces are concurrently specified as smiling face detection targets.

As shown in FIG. 15B, the user draws an enclosure surrounding four faces from the left on the back using the touchpanel.

If all faces within the enclosed area are set to be smiling face detection targets, the smiling face detection targets are changed from the two subjects on the front to the four subjects on the back. The four subjects on the back are surrounded by respective outlines while the outlines having surrounded the two subjects on the front disappear.

Figure 15D:
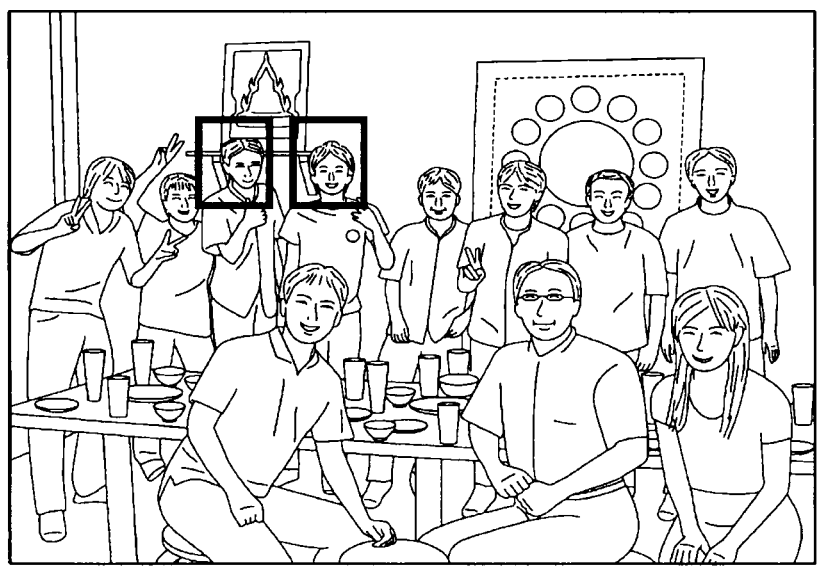
FIG. 15D illustrates screen updating in which a plurality of detected faces are concurrently specified as smiling face detection targets.

Subjects corresponding to the number of the smiling face detection targets, namely, two subjects may be switched. In that case, two subjects, namely, third and fourth persons from the left on the back among the four subjects surrounded in the touchpanel operation are determined as having a priority order higher than the other two subjects in accordance with the predetermined algorithm as shown in FIG. 15D. The outlines surrounding the third and fourth subjects from the left on the back are thus displayed. The outlines having surrounded the two detected faces from the left on the front disappear.

Figure 16:
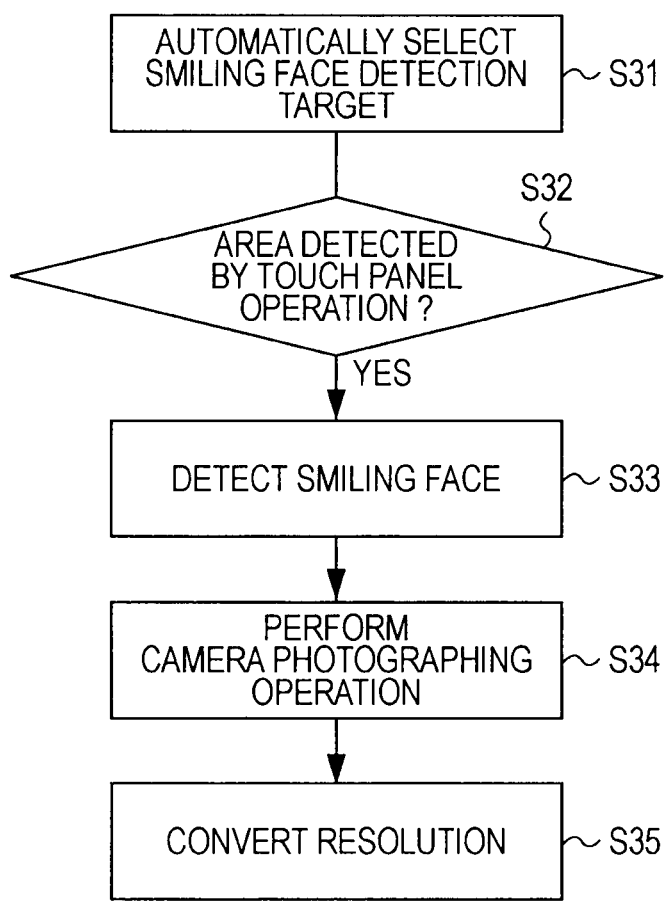
FIG. 16 is a flowchart of a smiling face detection target changing process for switching a smiling face detection target from one detected face to another in response to a user operation on a touchpanel.

FIG. 16 is a flowchart of a process for changing the smiling face detection target from one detected face to another detected face in response to the user touchpanel operation.

The digital still camera 1 performs the face detection process on the input image. The digital still camera 1 determines each detected face in terms of importance, prioritizes the detected faces, and automatically selects a predetermined number of subjects starting with the subject having the highest priority as the smiling face detection targets (step S31).

Each detected face is surrounded by an outline on the through image. The user recognizes the subject selected as the smiling face detection target on the monitor display 25. The user may wish to change the smiling face detection target to another detected face. In that case, the user performs the touchpanel operation to surround the desired face as the smiling face detection target (step S32).

If an area defined by the touched coordinates is recognized in the position detection, the CPU 29 detects face within the area through the image pattern detection (step S33). If a face image is detected from within the area defined by the touch operation, the priority of that detected face is promoted in priority (step S34). Along with the priority promotion, the subjects having had the priority higher than that subject are demoted in priority.

An outline production process is performed on the face having now the highest priority in accordance with the new prioritization. The resulting image is displayed on the OSD on the monitor display 25 (step S35).

The imaging device of embodiments of the present invention allows the user to detect freely a smiling face and to select the subject having the smiling face. The user can specify a subject as a smiling face detection target on the touchpanel displaying the through image. The imaging device thus displays on the through image a subject as the smiling face detection target and a subject as no-target subject t in the distinctly different manner. For example, when persons in an event such as a party are photographed in a relatively large viewing angle, the auto photographing operation may be performed in response to smiling face detection results on condition that at least two members in the party are smiling.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device, comprising:
   image input means for inputting an image of a subject;
   image signal processing means for processing the input image;
   display means for displaying on a display screen an input image processed by the image signal processing means;
   face detection means for detecting a face of the subject from the input image processed by the image signal processing means;
   target face setting means for setting one of the faces, detected by the face detection means, as a smiling face detection target;
   display control means for displaying, on the input image displayed by the display means, the detected face set by the target face setting means in a manner such that the set detected face is distinctly different from the other detected faces;
   detection face changing means for changing the smiling face detection target to another detected face in response to a user operation performed on the display screen that displays the detected face set as the smiling face detection target and the other detected faces in the distinctly different manner;
   smiling degree detection means for detecting a degree of smile of the detected face as the smiling face detection target; and
   photographing control means for controlling a photographing operation in response to a smiling detection threshold level reached by the degree of smile detected by the smiling degree detection means,
   wherein when the face detection means detects a plurality of faces from the input image, the target face setting means determines an importance of each detected face based on a position and other information relating to the detected face in the input image, prioritizes the detected faces according to the importance of the respective detected faces, and sets as initial face detection targets each of the detected faces of a predetermined number starting with the one having the highest priority,
   when the detection face changing means identifies a detected face specified by the user operation, the target face setting means sets the user-specified detected face as one of the face detection targets having the highest priority, and
   when the number of the plurality of faces from the input image is greater than the predetermined number, and the user-specified detected face is not one of the initial face detection targets, the target face setting means removes a detected face in the initial face detection targets having the lowest importance as one of the face detection targets.

2. The imaging device according to claim 1, wherein the display control means displays the input image with an outline attached to the detected face set as the smiling face detection target.

3. The imaging device according to claim 1, wherein the display control means displays the input image with an outline attached to each of the faces detected by the face detection means, wherein the detected face set as the smiling face detection target is displayed with the outline thereof changed in a display mode or with an accompanying predetermined icon.

4. The imaging device according to claim 1, wherein if at least two smiling faces are set as smiling face detection targets, the photographing control means automatically performs the photographing operation in response to a detection of at least one smiling face or automatically performs the photographing operation in response to a detection of the smiling faces from all selected subjects.

5. The imaging device according to claim 1, wherein the display means comprises a touchpanel and
the user operation to identify a detected face is performed on the touchpanel.

6. The imaging device according to claim 1, wherein the display means comprises a directional operation key indicating a direction on the display screen, and
wherein the detection face changing means identifies a detected face specified by a user with the directional operation key.

7. The imaging device according to claim 1, wherein
the number of subjects as smiling face detection targets is limited to N, and wherein if detected faces of more than N are contained in the area on the display screen specified by the user with the touchpanel, the detection face changing means determines the importance of each of the detected faces within the area, prioritizes each detected face in accordance with the importance thereof, and sets the N detected faces as smiling face detection targets starting with the one having the highest priority.

8. A method of performing a photographing operation on an input image of a subject, comprising steps of:
processing the input image;
displaying on a display screen the processed input image;
detecting a face of the subject from the processed input image;
setting one of the detected face as a smiling face detection target;
displaying, on the input image displayed on the display screen, the detected face set in a manner such that the set detected face is distinctly different from the other detected faces;
changing the smiling face detection target to another detected face in response to a user operation performed on the display screen that displays the detected face set as the smiling face detection target and the other detected faces in the distinctly different manner;
detecting a degree of smile of the detected face as the smiling face detection target; and
controlling a photographing operation in response to a smiling detection threshold level reached by the degree of smile detected by the detecting the degree of smile
the method further including
when the detecting detects a plurality of faces from the input image, determining an importance of each detected face based on a position and other information relating to the detected face in the input image, prioritizing the detected faces according to the importance of the respective detected faces, and setting as initial face detection targets each of the detected faces of a predetermined number starting with the one having the highest priority,
when identifying a detected face specified by the user operation, setting the user-specified detected face as one of the face detection targets having the highest priority, and when the number of the plurality of faces from the input image is greater than the predetermined number, and the user-specified detected face is not one of the initial face detection targets, removing a detected face in the initial face detection targets having the lowest importance as one of the face detection targets.

9. The method according to claim 8, wherein the step of displaying the detected face comprises displaying the input image with an outline attached to the detected face set as the smiling face detection target.

10. The method according to claim 8, wherein the step of displaying the detected face comprises displaying the input image with each of the detected faces with an outline attached to each of the faces, wherein the detected face set as the smiling face detection target is displayed with the outline thereof changed in a display mode or with an accompanying predetermined icon.

11. The method according to claim 8, further comprising:
if at least two detected faces are set as smiling face detection targets, automatically performing the photographing operation in response to a detection of at least one smiling face or in response to a detection of the smiling faces from all selected subjects.

12. The method according to claim 8, wherein the display screen comprises a touchpanel and
a user operation to identify a detected face is performed on the touchpanel.

13. The method according to claim 8, wherein the number of subjects set as smiling face detection targets is limited to N, and
wherein if detected faces of more than N are contained in the area on the display screen specified by the user with the touchpanel, the step of changing the smiling face detection target to another detected face includes determining the importance of each of the detected faces within the area, prioritizing each detected face in accordance with the importance thereof, and setting the N detected faces as smiling face detection targets starting with the detected face having the highest priority.

14. A non-transitory computer-readable medium storing a computer program that causes a computer to perform a method of performing a photographing operation on an input image of a subject, comprising steps of:
processing the input image;
displaying on a display screen the processed input image;
detecting a face of the subject from the processed input image;
setting one of the detected face as a smiling face detection target;
displaying, on the input image displayed on the display screen, the detected face set in a manner such that the set detected face is distinctly different from the other detected faces;
changing the smiling face detection target to another detected face in response to a user operation performed on the display screen that displays the detected face set as the smiling face detection target and the other detected faces in the distinctly different manner;
detecting a degree of smile of the detected face as the smiling face detection target; and
controlling a photographing operation in response to a smiling detection threshold level reached by the degree of smile detected by the detecting the degree of smile,
the method further including
when the detecting detects a plurality of faces from the input image, determining an importance of each detected face based on a position and other information relating to the detected face in the input image, prioritizing the detected faces according to the importance of the respective detected faces, and setting as initial face detection targets each of the detected faces of a predetermined number starting with the one having the highest priority, when identifying a detected face specified by the user operation, setting the user-specified detected face as one of the face detection targets having the highest priority, and when the number of the plurality of faces from the input image is greater than the predetermined number, and the user-specified detected face is not one of the initial face detection targets, removing a detected face in the initial face detection targets having the lowest importance as one of the face detection targets.

15. An imaging device, comprising:

an image input unit inputting an image of a subject;

an image signal processing unit processing the input image;

a display unit displaying on a display screen an input image processed by the image signal processing unit;

a face detection unit detecting a face of the subject from the input image processed by the image signal processing unit;

a target face setting unit setting one of the faces, detected by the face detection unit, as a smiling face detection target;

a display control unit for displaying, on the input image displayed by the display unit, the detected face set by the target face setting unit in a manner such that the set detected face is distinctly different from the other detected faces;

a detection face changing unit changing the smiling face detection target to another detected face in response to a user operation performed on the display screen that displays the detected face set as the smiling face detection target and the other detected faces in the distinctly different manner;

a smiling degree detection unit that detects a degree of smile of the detected face as the smiling face detection target; and a photographing control unit that controls a photographing operation in response to a smiling detection threshold level reached by the degree of smile detected by the smiling degree detection unit, wherein when the face detection unit detects a plurality of faces from the input image, the target face setting unit determines an importance of each detected face based on a position and other information relating to the detected face in the input image, prioritizes the detected faces according to the importance of the respective detected faces, and sets as initial face detection targets each of the detected faces of a predetermined number starting with the one having the highest priority, when the detection face changing unit identifies a detected face specified by the user operation, the target face setting unit sets the user-specified detected face as one of the face detection targets having the highest priority, and when the number of the plurality of faces from the input image is greater than the predetermined number, and the user-specified detected face is not one of the initial face detection targets, the target face setting unit removes a detected face in the initial face detection targets having the lowest importance as one of the face detection targets.

* * * * *